United States Patent [19]

Meyer

[11] Patent Number: 4,875,878

[45] Date of Patent: Oct. 24, 1989

[54] EXTENSION CORD/TOOL CARRIER

[75] Inventor: Robert R. Meyer, Cincinnati, Ohio

[73] Assignee: Meyer Flooring Inc., Cincinnati, Ohio

[21] Appl. No.: 272,221

[22] Filed: Nov. 16, 1988

[51] Int. Cl.⁴ ............................................. H01R 13/73
[52] U.S. Cl. ...................................... 439/501; 439/577
[58] Field of Search ......................... 439/501, 577, 894

[56] References Cited

U.S. PATENT DOCUMENTS

| | | |
|---|---|---|
| 3,049,688 | 8/1962 | Sinopoli . |
| 3,290,453 | 12/1966 | Jensen . |
| 3,733,478 | 5/1973 | Barker . |
| 4,083,621 | 4/1978 | Davidson et al. . |
| 4,095,871 | 6/1978 | Holte . |
| 4,212,421 | 7/1980 | Scott . |
| 4,282,954 | 8/1981 | Hill . |
| 4,338,497 | 7/1982 | Drew . |
| 4,353,613 | 10/1982 | Carlow . |
| 4,731,029 | 3/1988 | Lerner et al. . |

Primary Examiner—Gary F. Paumen
Attorney, Agent, or Firm—Wood, Herron & Evans

[57] ABSTRACT

An extension cord/tool carrier is provided comprised of a bucket to which is mounted a terminal strip. The bucket may be used to contain the extension cord coupled to the terminal strip as well as hand tools to be used on a job site.

10 Claims, 1 Drawing Sheet

EXTENSION CORD/TOOL CARRIER

BACKGROUND OF THE INVENTION

I. Field of the Invention

The present invention relates to extension cord apparatus adapted to carry hand tools as well as the electrical extension cord.

II. Description of the Prior Art

Electrical extension cords are well known. One example is a multi-strip outlet or terminal strip. A terminal strip typically includes a metal rectangular housing supporting several female electrical receptacles. Coupled electrically within the housing to the receptacles is one end of a length of electrical cord. The cord extends from the housing and terminates in a male plug member to be received in a wall socket for example. One such terminal strip is shown in U.S. Pat. No. 3,049,688.

A common desire with extension cords has been to provide a mechanism by which to support the extension cord electrical receptacles and also to carry the length of cord. Numerous such carrying devices have been developed and may be seen by way of example in U.S. Pat. Nos. 3,290,453; 3,733,478; 4,083,621; 4,095,871; 4,212,421; 4,282,954; 4,338,497; 4,353,613 and 4,731,029. A drawback to extension cord apparatus shown in those patents is that a handyman, do-it-yourselfer or construction trades worker may have difficulty reproducing such apparatus. That is, such apparatus generally require construction of a support or other mechanism not routinely available from a wide variety of sources. Another drawback is that in each of these patents the apparatus provided for supporting the extension cord and its outlets is not shown to provide structure by which a user of the cord might also transport a number of hand tools around the work site along with the extension cord receptacles. In the construction trades, for example, a workman would have to carry the extension cord apparatus to and around a work site and may also have to separately carry the many tools to be used at or around the job site. Carrying all of these separate items may complicate the job the workman has to do, may slow down performance on the job and could lead to tools being lost or misplaced.

SUMMARY OF THE INVENTION

The present invention provides an extension cord/tool carrier apparatus to overcome the abovementioned drawbacks. The present invention thus permits transporting not only the extension cord but also hand tools by provision of a bucket container into which a workman may place several hand tools as the workman moves around the job site or travels to and from the job site. In a preferred embodiment, the present invention provides such a carrying device in the form of a bucket to which the extension cord receptacles, such as a terminal strip housing, may be externally secured. A user may take advantage of the depth of the bucket to contain not only the extension cord extending from the receptacles but also some of the tools the workman may find useful on the job. Thus, in accordance with the present invention, a row of electrical plug receptacles are exteriorly mounted to the sidewall of a bucket. Contained within the bucket is a length of electrical cord, one end of which is electrically coupled to the receptacles. The rest of the cord and the plug member connected to the other end of that cord may be received within the bucket and may also be selectively removed through the top thereof so that the plug may be connected to a source of electrical supply. Also, selected tools may be placed into the bucket through the top for storage and transport.

In a preferred embodiment, the bucket is a standard plastic five-gallon bucket. Such buckets may be commonly encountered in the construction trades such as five-gallon containers used for paint or joint compound, for example. In a preferred embodiment, the plug receptacles are carried by a terminal strip housing and the housing is mounted to the exterior of the plastic bucket by screws or the like. Further, the electrical cord connects to the terminal strip through an aperture in the sidewall. In accordance with a preferred embodiment, construction of the present invention may be accomplished with components readily obtainable by a handyman, do-it-yourselfer or construction trades worker, such as screws, a terminal strip, a length of electrical cord and a plastic bucket whereby the invention may be easily and readily constructed and put to use without the need for specially built or obtained components.

These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate a preferred embodiment of the invention and, together with a general description of the invention given above, and the detailed description of the preferred embodiment given below, serve to explain the principles of the invention.

DESCRIPTION OF THE PREFERRED EMBODIMENT

Figure 1:
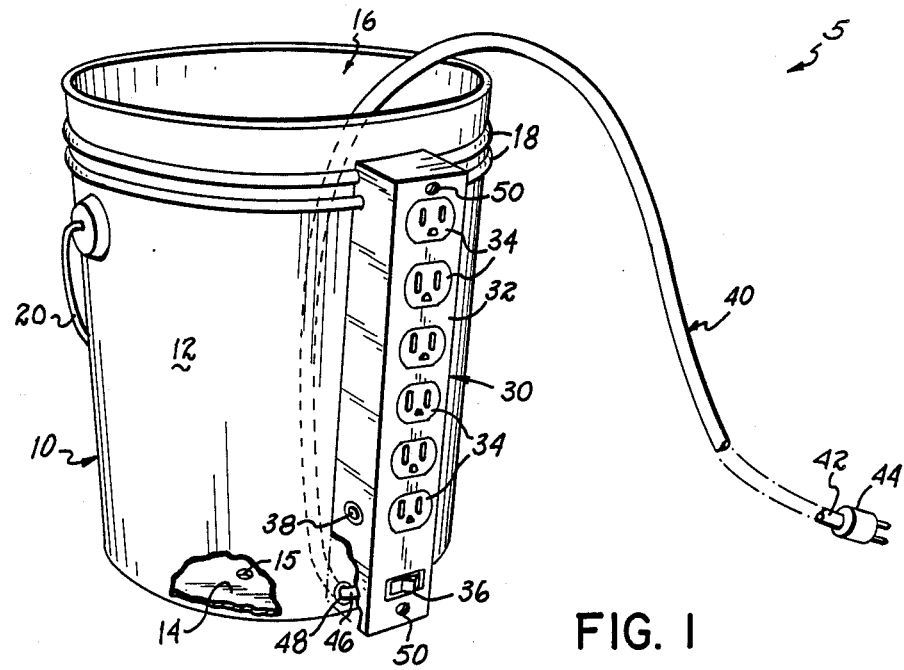
FIG. 1 is a perspective, partially cut-away view of an extension cord/tool carrier according to the principals of the invention.
Figure 2:
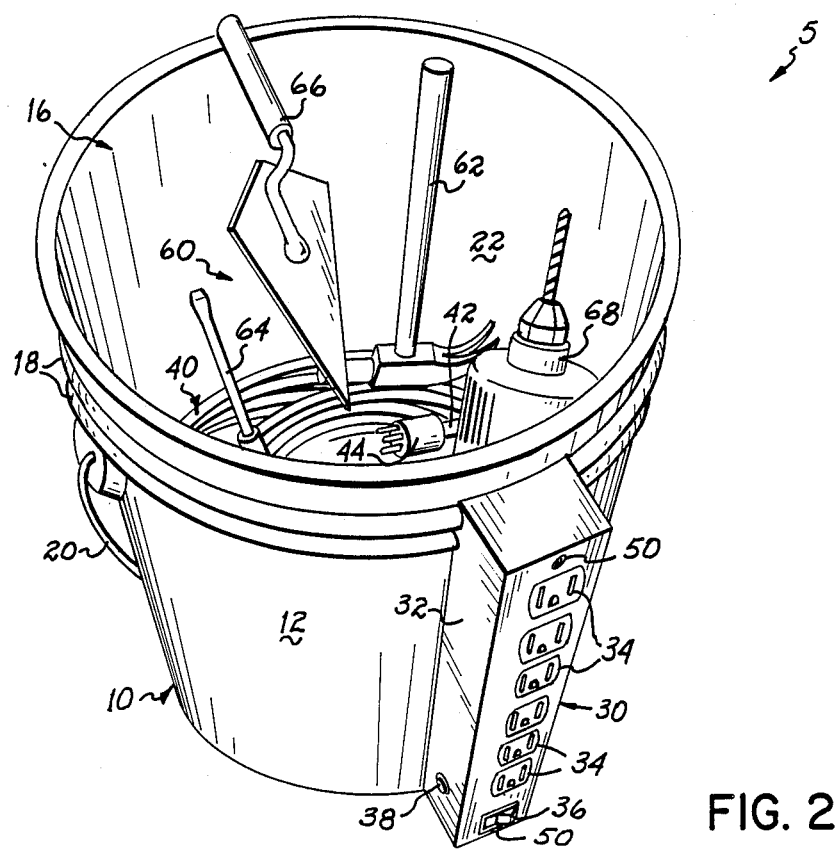
FIG. 2 is a perspective view of the extension cord/tool carrier of FIG. 1 shown carrying a variety of hand tools as well.

With reference to FIG. 1, an extension cord/tool carrier 5 is shown in accordance with the principals of the present invention. Carrier 5 includes a bucket 10 such as a standard plastic 5-gallon container used for paint, joint compound or the like. Bucket 10 is shown in FIG. 1 and is comprised of a plastic, cylindrical sidewall 12, and a generally closed bottom 14 as is conventional. Bottom 14 may be provided with one or more ports 15 to let dirt and water pass out of bucket 10. Top 16 of bucket 10 is open as seen in FIGS. 1 and 2 and may be closed by a conventional lid (not shown). Formed integral and about the exterior of sidewall 12 near top 16 may be a pair of rings 18 as is commonly provided on buckets such as bucket 10. Bucket 10 also includes a handle 20 mounted to sidewall 12 as is conventional. The interior or cavity 22 defined by sidewall 12 of bucket 10 may be employed to hold a length of electrical cord and hand tools as will be described.

Exteriorly mounted to sidewall 12 is a multi-strip outlet or terminal strip 30. Terminal strip 30 is comprised of a rectangular metal housing 32 supporting a plurality of female electrical receptacles 34, an electrical switch 36, and a circuit breaker 38. Switch 36 and breaker 38 are desirable for safety reasons but may be dispensed with. A length of electrical cord 40 is coilably received in cavity 22. One end 42 of cord 40 is electrically coupled to a male plug member 44 (FIG. 1) as is conventional. The other end 46 of cord 40 extends through an aperture 48 formed in sidewall 12. End 46 is electrically coupled in series to receptacles 34, switch 36 and breaker 38 as is also conventional. As is well known, switch 36 operates to turn receptacles 34 on and off when plug member 44 is coupled to a source of supply such as an electrical wall socket (not shown). Breaker 38, which is also a form of switch, also operates in known fashion to cut-off power to receptacles 34 in the event of a current overload or the like. Thus, switch 36 and breaker 38 each may be utilized to electrically disconnect receptacles 34 from plug member 44.

Terminal strip housing 32 may be held to sidewall 12 by a pair of screws 50 which extend through housing 32 and through sidewall 12 where they may be secured by nuts (not shown) in known fashion. Strip 30 may be secured to sidewall 12 by other conventional fastening means as may be convenient. Also, portions of rings 18 may be removed such as with a knife so that the back of housing 32 rests substantially flush against sidewall 12. Aperture 48 may also be provided by cutting through sidewall 12 with a knife or by drilling same with a drill. Aperture 48 is preferably positioned so that strip 30 overlies same to thereby conceal aperture 48 from view exteriorly of sidewall 12.

The present invention may be easily and readily constructed from simple and readily obtained parts. For example, bucket 10 is preferably a conventional five gallon plastic bucket such as is used to carry paint or joint compound or other materials used in the construction trades. Hence, bucket 10 is readily available to those in the construction trades, for example. Terminal strip 30 is readily available at most hardware outlet stores and many department stores such as Sears. Terminal strip 30 is mounted to sidewall 12 of bucket 10 by readily available screws and nuts or other conventional fastening means. Also, any structural change to bucket 10 such as cutting rings 18, aperture 48 and/or port 15 may be readily accomplished with a commonly encountered tool such as a knife. Terminal strip 30 may be purchased with a length of cord 40 already attached thereto. In this event, cord 40 may be spliced in the middle and an exposed end passed through aperture 48 from the exterior of bucket 10 and spliced to an additional length of cord 40 within bucket 10.

In use, cord 40 may be coiled up within cavity 16 of bucket 10 for storage as seen in FIG. 2. Also, as seen in FIG. 2, various hand tools 60 may be placed within bucket 10 through the top 16 for carrying by a user (not shown) with the aid of handle 20. Although not limited thereto, tools 60 are shown by way of example as including a hammer 62, a screwdriver 64, a trowel 66 and a power tool 68. When it is desired to make use of the extension cord feature of carrier 5, a user reaches in through top 16 and grabs plug member 44 or a portion of cord 40 and merely pulls the desired length of cord 40 out through top 16. Bucket 10 will retain the remainder of cord 40 to avoid, for example, having excess cord 40 on the floor of a job site (not shown). Plug member 44 may then be coupled to a source of supply such as an electrical wall socket (not shown) to couple power to the extension cord outlets 34 of terminal strip 30.

Switch 36 is placed in the on or off state as desired, the on-state being selected to couple power to receptacles 34 to energize any appliance, tool or other electrical device plugged into a socket 34. For example, power tool 68 could be plugged into a socket 34 so that the user (not shown) may run tool 68 at the job site. To this end, the present invention also permits carrying of tools 60 as seen in FIG. 2. A user (not shown) may selectively remove and replace any of tools 60 as necessary. Also, a user may move bucket 10 around the various locations of a job site (not shown) as necessary and will then have available both tools and power as necessary to perform the tasks desired.

To stow the items, the user merely places tools 60 and cord 40 with plug member 44 into cavity 22 through top 16. Thereafter, cord 40 and tools 60 may be readily moved about with the aid of handle 20.

While the present invention has been illustrated by description of a preferred embodiment and while a preferred embodiment has been described in considerable detail, it is not the intention of applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. By way of example, while strip 30 is shown mounted exteriorly of bucket 10, it could be mounted interiorly thereof with the surface of receptacles 34 generally flush with the exterior of surface of sidewall 12. In either event, receptacles 34 are considered mounted to sidewall 12 exteriorly of cavity 22 in that receptacles 34 are adapted to receive a male plug (not shown) positioned outside bucket 10. Accordingly, departures may be made from such details without departing from the spirit or scope of applicant's general inventive concept.

What is claimed is:

1. An extension cord/tool carrier comprising:
    a bucket having a vertical sidewall to define a cavity adapted to receive a length of electrical cord and a plurality of hand tools therein through an open top formed at one end of the bucket cavity;
    a row of electrical plug receptacles fixedly mounted to the sidewall of the cavity;
    a length of electrical cord receivable within the bucket cavity, the cord being electrically coupled at a first end to the receptacles and at a second end to a plug member whereby the bucket provides a container for transporting the cord therein, the receptacles thereon and selected tools which a user places therein through the open top and whereby the plug member and a length of the cord may be selectively removed from the bucket through the open top for connection to a source of electrical supply so as to provide power at the receptacles.

2. The extension cord/tool carrier of claim 1 further comprising:
    a terminal strip housing mounted to the sidewall exteriorly of the cavity, the receptacles being mounted to the terminal strip housing;
    aperture means in the bucket sidewall for receiving therethrough a portion of the electrical cord between the ends thereof whereby to permit the first end to be electrically coupled to the receptacles within the terminal strip housing.

3. The extension cord/tool carrier of claim 1 further including:
    handle means coupled to the bucket sidewall for carrying the bucket.

4. The extension cord/tool carrier of claim 1 further comprising:

switch means for electrically disconnecting the receptacles from the plug member.

5. The extension cord/tool carrier of claim 1, the bucket being five-gallon in size and formed of plastic.

6. The extension cord/tool carrier of claim 1, said bucket being a five-gallon paint bucket.

7. The extension cord/tool carrier of claim 1, further comprising:
   a closed bottom formed at another end of the bucket cavity; and
   port means in the bucket bottom for removal of dirt and liquid from the bucket cavity.

8. An extension cord/tool carrier comprising:
   a five-gallon plastic bucket, the bucket having a cylindrical sidewall to define a cavity and a bottom wall generally sealing one end of the cavity, whereby another end of the cavity is open to define a top to the bucket;
   a terminal strip mounted vertically to the sidewall exteriorly of the bucket, the terminal strip having a plurality of electrical receptacles mounted thereon;
   an electrical cord extending between first and second ends, the first end being connected to a plug body, the second end extending through an aperture in the bucket sidewall for connection to the receptacles, the cord being receivable in the cavity through the bucket top, the bucket being adapted to receive a plurality of hand tools in the cavity through the bucket top along with the cord.

9. The extension cord/tool carrier of claim 8, wherein the aperture is positioned in the sidewall in concealed relationship to the terminal strip.

10. The extension cord/tool carrier of claim 8, further comprising:
   port means in the bottom wall for removal of dirt and liquid from the bucket cavity.

* * * * *